(12) United States Patent
Boivin et al.

(10) Patent No.: US 8,885,816 B2
(45) Date of Patent: Nov. 11, 2014

(54) METHOD FOR DETECTING AN ILLICIT USE OF A SECURITY PROCESSOR

(75) Inventors: Mathieu Boivin, Vaureal (FR); Gilles Dubroeucq, Saint Piat (FR)

(73) Assignee: Viaccess, Paris la Defense (FR)

( * ) Notice: Subject to any disclaimer, the term of this patent is extended or adjusted under 35 U.S.C. 154(b) by 15 days.

(21) Appl. No.: 13/811,791

(22) PCT Filed: Jul. 22, 2011

(86) PCT No.: PCT/EP2011/062689
§ 371 (c)(1),
(2), (4) Date: Jan. 23, 2013

(87) PCT Pub. No.: WO2012/010706
PCT Pub. Date: Jan. 26, 2012

(65) Prior Publication Data
US 2013/0121485 A1    May 16, 2013

(30) Foreign Application Priority Data

Jul. 23, 2010   (FR) ...................................... 10 56031

(51) Int. Cl.
| | | |
|---|---|---|
| *G06F 21/00* | (2013.01) | |
| *H04L 9/00* | (2006.01) | |
| *H04N 21/4623* | (2011.01) | |
| *H04N 21/4405* | (2011.01) | |
| *H04N 21/442* | (2011.01) | |

(52) U.S. Cl.
CPC .............. *H04L 9/00* (2013.01); *H04N 21/4623* (2013.01); *H04N 21/4405* (2013.01); *H04N 21/44236* (2013.01)
USPC .......................................................... 380/2

(58) Field of Classification Search
CPC .......... H04N 7/1675; H04N 21/26606; H04N 21/4181; H04N 21/4405; H04N 21/44236; H04N 21/4623

USPC ............................................................ 380/2
See application file for complete search history.

(56) References Cited

U.S. PATENT DOCUMENTS

| | | | | |
|---|---|---|---|---|
| 5,195,134 | A  * | 3/1993 | Inoue ............................ | 380/242 |
| 7,908,491 | B2 * | 3/2011 | Kudelski et al. .............. | 713/193 |
| 2008/0301437 | A1 * | 12/2008 | Chevallier et al. ............ | 713/155 |
| 2009/0323949 | A1 * | 12/2009 | Chieze et al. ................. | 380/239 |
| 2009/0327714 | A1 * | 12/2009 | Yaghmour .................... | 713/168 |
| 2010/0169664 | A1 * | 7/2010 | Danois et al. ................. | 713/189 |

FOREIGN PATENT DOCUMENTS

| | | |
|---|---|---|
| EP | 1447976 | 8/2004 |
| EP | 1575293 | 9/2005 |
| EP | 1742474 | 1/2007 |
| WO | WO 2008/049882 | 5/2008 |

OTHER PUBLICATIONS

Francis et al., "Countermeasures for attacks on satellite TV cards using open receivers", Australasian Information Security Workshop: Digital Right Management, Nov. 6, 2004, pp. 1-6.
"Functional Model of Conditional Access System", EBU Review, Technical European Broadcasting Union, Brussels, BE, n° 266, Dec. 21, 1995.

* cited by examiner

*Primary Examiner* — Peter Shaw
*Assistant Examiner* — Ali Shayanfar
(74) *Attorney, Agent, or Firm* — Occhiuti & Rohlicek LLP

(57) ABSTRACT

This method for detecting an illicit use of a security processor used for the descrambling of different multimedia contents disseminated on several respective channels comprises:
- the incrementing (153) of a counter $Kch_i$ by a predetermined step whenever, after verification, a message $ECM_{i,c}$ is received within a time slot immediately consecutive to a message $ECM_{i,p}$ and, if not, the resetting (158) of the counter $Kch_i$ at its initial value,
- the detection (162) of an illicit use as soon as the counter $Kch_i$ reaches a predetermined threshold.

10 Claims, 2 Drawing Sheets

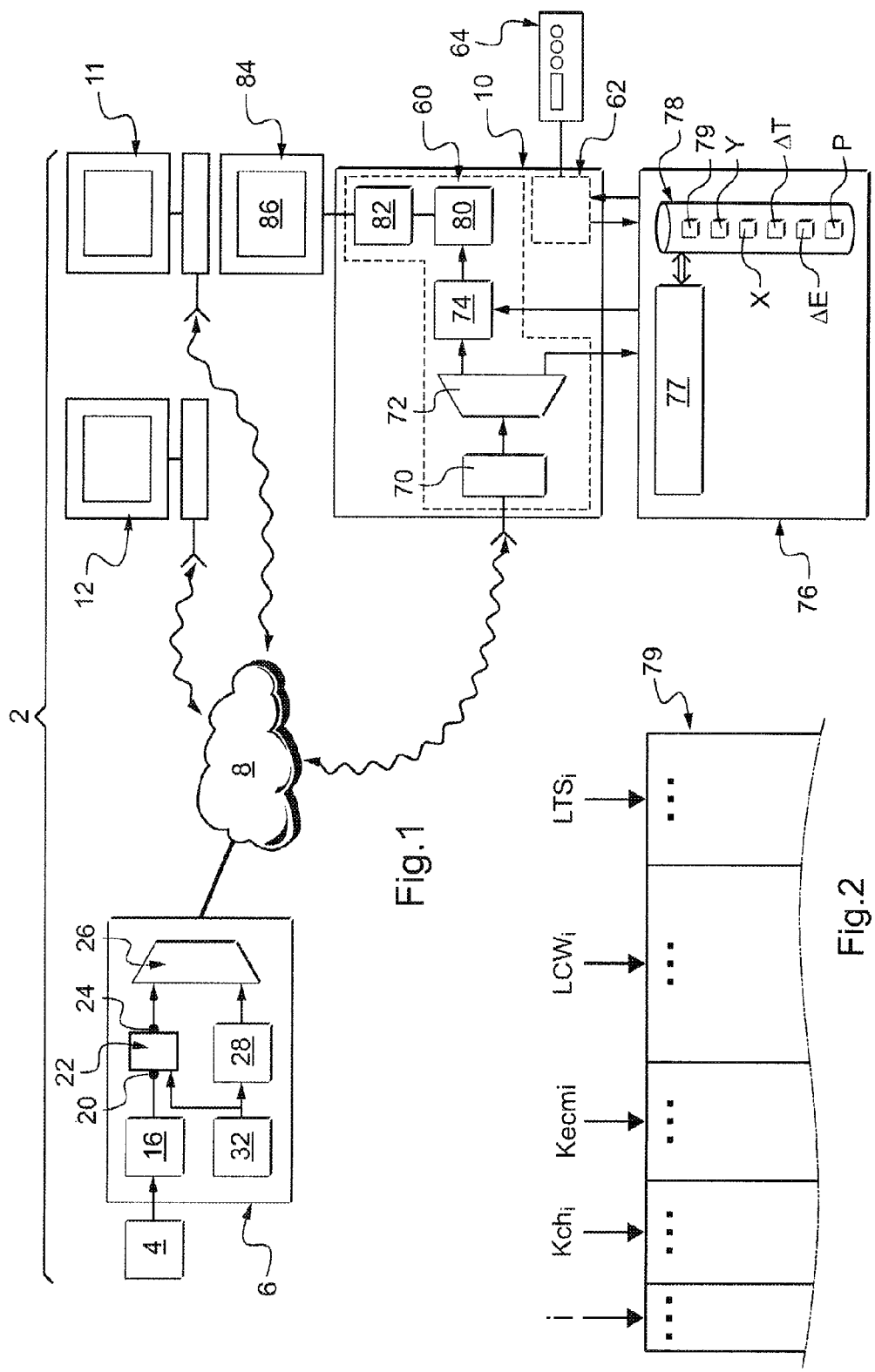

METHOD FOR DETECTING AN ILLICIT USE OF A SECURITY PROCESSOR

BACKGROUND OF THE INVENTION

The invention pertains to a method for detecting an illicit use of a security processor used for descrambling different multimedia contents disseminated on several respective channels. The invention also pertains to this security processor as well as to an information-recording medium to implement this method.

There are methods known to the filing party for detecting an illicit use. These methods include:

the reception by the electronic security processor of ECMs (Entitlement Control Messages) denoted as $ECM_{i,t}$ to descramble a temporal sequence of cryptoperiods of a scrambled channel i, each message $ECM_{i,t}$ containing at least one cryptogram of a control word $CW_{i,t}$ enabling a cryptoperiod $CP_{i,t}$ of the channel i to be descrambled, where i identifies the channel and the index t is a order number or sequential number, each time that the security processor receives a new message $ECM_{i,c}$, checking that the message $ECM_{i,c}$ is received within a predetermined time slot immediately consecutive to the preceding message $ECM_{i,p}$ received by this security processor for the channel i where the indices c and p are two specific values of the order number t, The term "time slot immediately consecutive to the preceding message $ECM_{i,p}$" designates a time slot of predetermined duration starting immediately after reception of the message $ECM_{i,p}$.

The term "multimedia content" designates an audio and/or visual content that is to be rendered in a form directly perceptible and comprehensible to a human being. Typically, a multimedia content corresponds to a succession of images forming a film, a television broadcast or advertisements. A multimedia content can also be an interactive content such as a game.

PRIOR ART

There are known ways of broadcasting several multimedia contents at the same time. To this end, each item of multimedia content is broadcast on its own channel. The channel used to transmit a multimedia content is also known as a "station". A channel typically corresponds to a television station. This enables a user to choose just the multimedia content that he wishes to view by changing channels To secure the viewing of multimedia contents and subject it to certain terms such as the payment of a subscription for example, the multimedia contents are broadcast in scrambled form and not in plain or unencrypted form. In this description, the channel is said to be "scrambled" when the multimedia broadcast on this channel is scrambled. More specifically, each multimedia content is divided into a sequence of cryptoperiods. Throughout the duration of a cryptoperiod, the conditions of access to the scrambled multimedia content remain unchanged. In particular, throughout the duration of a cryptoperiod, the multimedia content is scrambled with the same control word. Generally, the control word varies from one cryptoperiod to another. Furthermore, the control word is generally specific to a multimedia content. Thus if, at a given instant, N multimedia contents are broadcast simultaneously on N channels, then there are N different control words each used to scramble one of these multimedia contents.

Here, the terms "scramble"/"descramble" are considered to be synonyms. Similarly, the terms "encipher"/"decipher" are considered to be synonyms.

The plain or unencrypted multimedia content corresponds to the multimedia content before it is scrambled. This content can be made directly comprehensible to a human being without resorting to descrambling operations and without placing conditions on the viewing of this content.

The control words needed to descramble the multimedia contents are transmitted synchronizedly with the multimedia contents. For example, the control words needed to descramble the $t^{th}$ cryptoperiod are received by each terminal during the $t-1^{th}$ cryptoperiod. To this end, for example, the control words are multiplexed with the scrambled multimedia content.

To secure the transmission of the control words, these words are transmitted to the terminals in the form of cryptograms contained in ECMs (Entitlement Control Messages). The term "cryptogram" herein designates a piece of information that is not sufficient by itself to retrieve the control word in plain form. Thus, if the transmission of the control word is intercepted, knowledge alone of the control word cryptogram does not make it possible to retrieve the control word by which the multimedia content can be descrambled. To retrieve the plain control word, i.e. the control word used to directly descramble the multimedia content, it must be combined with a piece of secret information. For example, the cryptogram of the control word is obtained by enciphering the plain control word with a cryptographic key. In this case, the secret information is the cryptographic key which is used to decipher this cryptogram. The cryptogram of the control word can also be a reference to a control word stored in a table containing a multitude of possible control words. In this case, the secret information is the table associating a plain control word with each reference.

The secret information should be kept in a secure place. To this end, it has already been proposed to store the secret information in security processors such as chip cards directly connected to each of the terminals.

The multimedia contents broadcast over the different channels can be temporally coordinated with one another. For example, the multimedia content broadcasting times are set so as to match the broadcasting times indicated in a pre-established program schedule. Each terminal on a given channel therefore receives appreciably the same multimedia content at the same time. The multimedia contents are said to be "live" streams or "linearized" streams because the user does not control their instant of transmission.

In this context, attacks have been developed to enable users to descramble multimedia contents for which they have not licitly acquired rights of access.

One of these attacks is known as "card sharing". This attack consists in licitly acquiring a security processor in order to possess the rights of access needed to descramble several channels. Then, this "licit" security processor is introduced into a "pirate" server which receives ECMs from a multitude of pirate satellite terminals. Thus, when a pirate satellite terminal wishes to illicitly descramble a broadcast multimedia content, it receives this multimedia content and transmits the corresponding ECMs to the pirate server. The pirate server transmits these ECMs to the licit security processor. In response, the licit security processor deciphers the control words contained in these ECMs and sends back the control words in plain form to the pirate server. The pirate server then forwards these unencrypted or plain control words to the pirate satellite terminal which can then descramble the desired multimedia content.

In this attack, the security processor is used normally except that it processes ECMs from a multitude of satellite terminals whereas in a licit use, it processes the ECMs of only one terminal. To detect this kind of attack, it is already been proposed to:
- enumerate the changes in channels occurring over a predetermined period of time (see patent application EP 1 575 293),
- enumerate the number of different channels descrambled by the security processor over a predetermined period of time (see patent application EP 1 447 976), and
- enumerate the number of ECMs received by the security processor over a predetermined period (see patent application WO 2008 049 882).

These detection methods all make use of the fact that an attack by card sharing results in:
- an abnormally large number of channel changes (zapping), and/or
- an abnormally large number of ECMs received.

The detection of this attack then makes it possible to set up countermeasures.

There is also another attack known as "control word sharing" which too makes use of a licit security processor to descramble one or more channels. In this attack, the licit security processor is introduced into the control word server. This server receives the multimedia content and extracts the ECMs therefrom. The extracted ECMs are transmitted to the legal security processor which then deciphers the cryptograms of the control words and sends back the control words thus deciphered to the server. The server then broadcasts or disseminates these control words to a large number of pirate satellite terminals, thus enabling them to illegally descramble the multimedia contents. For example, in this attack, the pirate satellite terminals simply subscribe to the stream of plain control words generated by the server and corresponding to the channel that they wish to descramble.

This last attack differs from the card-sharing attack by the fact that the pirate satellite terminals do not need to send the server the ECMs of the channel that they wish to descramble. Consequently, the number of ECMs processed by the security processor in this attack is far smaller than in a card-sharing attack. However if, for this attack, the same security processor is used to process the ECMs of different channels, this attack can still be detected by means of the prior-art detection methods presented here above.

More recently, card-sharing attacks or control-word-sharing attacks have been modified to make them more difficult to detect. The modification consists of the use not of only one licit security processor but, for example, of as many licit security processors as there are descramblable channels. Each licit security processor is then dedicated to a respective channel, i.e. it is used solely to process the ECMs of this channel in particular or a very limited number of channels. The rest of the attack is identical to what has been described here above. This means that the security processor no longer perceives any channel changing or zapping, thus making the known detection methods ineffective.

SUMMARY OF THE INVENTION

The invention seeks to overcome this drawback by proposing a new method for detecting an illicit use of a security processor.

An object of the invention therefore is a method comprising:
- the incrementing of a counter $Kch_i$ by a predetermined step whenever, after verification, the message $ECM_{i,c}$ is received within the time slot immediately consecutive to the message $ECM_{i,p}$ and, if not, the resetting of the counter $Kch_i$ at its initial value,
- the detection of an illicit use as soon as the counter $Kch_i$ reaches a predetermined threshold.

The above method makes it possible to detect card-sharing or control-word-sharing attacks should each card be dedicated to a restricted number of channels, indeed, in this case, the security processor processes the ECMs of a same channel over very lengthy periods of time. This prolonged absence of zapping is used here to detect an illicit use of the security processor. More specifically, this prolonged absence of zapping results in the fact that the counter $Kch_i$ reaches the predetermined threshold which triggers the detection of an illicit use.

In addition, the robustness of the detection method as regards stealthy zapping can be adjusted by setting the duration of the time slot.

The embodiments of this method may have one or more of the following characteristics:
- each message $ECM_{i,t}$ received also has a piece of chronological data making it possible to identify the immediately preceding message $ECM_{i,t-1}$ or the immediately consecutive message $ECM_{i,t+1}$ and the method includes the verification that the message $ECM_{i,c}$ is received within the time slot in verifying that the new message $ECM_{i,c}$ received is the message immediately consecutive to the preceding message $ECM_{i,p}$ on the basis of the piece of chronological data contained in the message $ECM_{i,c}$ or $ECM_{i,p}$;
- the method includes the verification that the message $ECM_{i,c}$ is received within the time slot in verifying that the difference between the time stamps $TS_c$ and $TS_p$ included, respectively, in the messages $ECM_{i,c}$ and $ECM_{i,p}$, is smaller than a predetermined time interval $\Delta T$ greater than twice the time interval between the time stamps of immediately consecutive messages $ECM_{i,t}$ and $ECM_{i,t+1}$;
- the method comprises:
  - measuring a time interval $\Delta V_{c,p}$ between the instants of reception of the messages $ECM_{i,c}$ and $ECM_{i,p}$, and
  - verifying that the message $ECM_{i,c}$ is received within the time slot in checking whether the interval $\Delta V_{c,p}$ measured is smaller than or equal to a predetermined interval $\Delta T$ greater than twice a time interval $\Delta V_{t,t+1}$ that can be measured between the instants of reception of the immediately consecutive messages $ECM_{i,t}$ and $ECM_{i,t+1}$;
- the method comprises:
  - enumerating the new messages $ECM_{j,c}$ received by this security processor for channels other than the channel i since the last message $ECM_{i,p}$ received, and
  - verifying that the message $ECM_{i,c}$ is received within the time slot in checking whether the number of new messages $ECM_{j,c}$ received for channels other than the channel i reaches or goes beyond a predetermined threshold greater than two;
- the method comprises the selection of the counter $Kch_i$ to be incremented from among X possible counters $Kch_j$ where X is an integer greater than or equal to 2 as a function of an identifier of the channel i contained in the message $ECM_{i,c}$;
- the method comprises:
  - enumerating the channels associated with a counter $Kch_i$ that have reached or gone beyond their respective predetermined thresholds,
  - comparing the number Z of counters $Kch_i$ that have reached or gone beyond their respective predetermined threshold with a predetermined limit P equal to the maximum number of channels that can be simultaneously descrambled by means of this security processor, and if the number Z reaches or goes beyond the boundary P, then automatically triggering a strong countermeasure and, if not, triggering another weaker countermeasure;

in response to the detection of an illicit use the method comprises the automatic triggering of a countermeasure that prevents the descrambling of the channel i and displays a message on a screen asking the user to perform a specific action to restore the descrambling of the channel i; the specific action is a channel change.

These embodiments furthermore have the following advantages:

comparing the difference between the time stamps or time intervals $\Delta V_{c,p}$ with the interval $\Delta T$ prevents the counter $Kch_i$ from being reset by a simple to-and-fro operation from the channel i to another channel, which would easily thwart the detection movement described here, enumerating the number of ECM messages received between the message $ECM_{i,p}$ and $ECM_{i,c}$ and then comparing this number with a threshold also prevents the detection method from being thwarted by a simple to-and-fro movement from the channel i to another channel;

selecting the counter $Kch_i$ to be incremented as a function of an identifier of the channel i makes it possible to implement the above detection method even when the security processor is designed to receive ECMs to simultaneously descramble X different channels;

enumerating the number of counters $Kch_i$ that have reached or gone beyond their predetermined threshold and comparing this number with the limit P of simultaneously descramblable channels makes it possible to detect illicit use with certainty;

the descrambling is blocked by the display on a screen of a message asking the user to undertake a specific action makes it more difficult to carry out card-sharing attacks or control-word-sharing attacks while limiting the negative consequences for the user in the event of a false detection of illicit use;

asking the user to zap between channels to restore the descrambling of this channel makes it possible to simply restore this descrambling in the event of a false detection of illicit use while making it more difficult to carry out card-sharing or control-word-sharing attacks.

An object of the invention is also an information-recording medium comprising instructions for executing the above method, when these instructions are executed by an electronic computer. Finally, an object of the invention is also an electronic security processor for a terminal used to descramble different multimedia contents disseminated on several respective channels, this processor being capable of:

receiving ECMs (Entitlement Control Messages) denoted as $ECM_{i,t}$ to descramble a temporal sequence of cryptoperiods of a scrambled channel i, each message $ECM_{i,t}$ containing at least one cryptogram of a control word $CW_{i,t}$ enabling a cryptoperiod $CP_{i,t}$ of the channel i to be descrambled, the index i identifying the channel and the index t being a order number, whenever a new message $ECM_{i,c}$ is received, checking that the message $ECM_{i,c}$ is received within a predetermined time slot immediately consecutive to the preceding message $ECM_{i,p}$ received by this security processor for the channel i where the indices c and p are two specific values of the order number t, incrementing a counter $Kch_i$ by a predetermined step whenever, after verification, the message $ECM_{i,c}$ is received within the time slot immediately consecutive to the message $ECM_{i,p}$ and, if not, resetting the counter $Kch_i$ at its initial value, detecting an illicit use as soon as the counter $Kch_i$ reaches a predetermined threshold.

BRIEF DESCRIPTION OF THE DRAWINGS

The invention will be understood more clearly from the following description, given purely by way of a non-exhaustive example and made with reference to the appended drawings, of which:

FIG. 1 is a schematic illustration of a system for transmitting and receiving scrambled multimedia contents, FIG. 2 is an schematic illustration of a table used in the system of FIG. 1.

In these figures, the same references are used to designate the same elements.

DETAILED DESCRIPTION OF THE INVENTION

Figure 3:
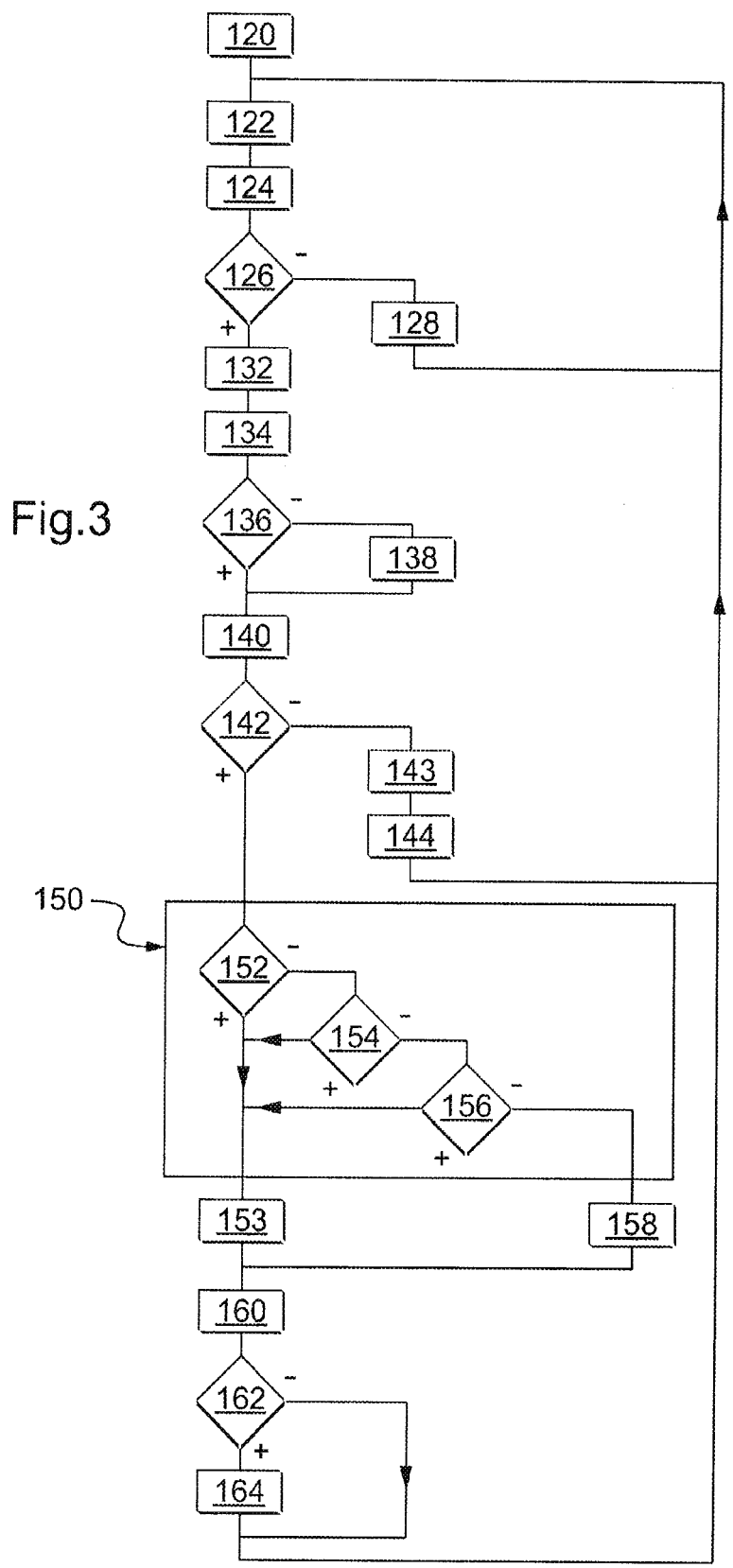
FIG. 3 is a flowchart of a method to cypher and uncypher multimeda contents in which illicit usage of security processor is detected with the system of FIG. 1.

Here below in this description, the characteristics and functions well known to those skilled in the art are not described in detail. Furthermore, the terminology used is that of systems of conditional access to multimedia contents. For further information on this terminology, the reader may refer to the following document:

<<Functional Model of Conditional Access System>>, EBU Review, Technical European Broadcasting Union, Brussels, BE, no 266, 21 Dec. 1995.

FIG. 1 shows a system 2 for sending and receiving scrambled multimedia contents. The multimedia contents sent are linearized multimedia contents. For example, each multimedia content corresponds to a sequence of an audiovisual program such as a television broadcast or a film.

The plain multimedia contents are generated by one or more sources 4 and transmitted to a broadcasting device 6. The device 6 broadcasts the multimedia contents simultaneously towards a multitude of reception terminals through an information transmission network 8. The broadcast multimedia contents are time-synchronized with one another, for example to comply with a preset program schedule.

The network 8 is typically a long-distance information transmission network such as the Internet or a satellite network or any other type of broadcasting network such as the one used to transmit digital terrestrial television (DTTV).

To simplify FIG. 1, only three reception terminals 10 to 12 are shown.

The device 6 comprises an encoder 16 which compresses the multimedia contents that it receives. The encoder 16 processes the digital multimedia contents. For example, this encoder works in compliance with the MPEG2 (Moving Picture Expert Group-2) standard or the UIT-T H264 standard.

The compressed multimedia contents are sent towards an input of a scrambler 22. The scrambler 22 scrambles each compressed multimedia content to make its viewing conditional on certain terms such as the purchase of a title of access by the users of the reception terminals. The scrambled multimedia contents are rendered at an output 24 connected to the input of a multiplexer 26.

The scrambler 22 scrambles each compressed multimedia content by means of a control word $CW_{i,t}$ that is given to it as well as to a conditional access system 28 by a key generator 32. The system 28 is better known as a CAS (Conditional Access System). The index i is an identifier of the channel on which the scrambled multimedia content is broadcast and the index t is an identifier of the cryptoperiod scrambled with this control word. Here below in this description, the cryptoperiod currently scrambled by the terminals is the cryptoperiod t−1 Typically, this scrambling is compliant with a standard such as the DVB-CSA (Digital Video Broadcasting-Common Scrambling Algorithm), ISMA Cryp (Internet Streaming Media Alliance Cryp), SRTP (Secure Real-time Transport Protocol), AES (Advanced Encryption Standard) etc.

For each channel i, the system 28 generates ECMs (Entitlement Control Messages) denoted as messages $ECM_{i,t}$ containing at least the cryptogram $CW^*_{j,t}$ of the control word $CW_{j,t}$ generated by the generator 32 and used by the scrambler 22 to scramble the cryptoperiod t of the channel i. These messages and the scrambled multimedia contents are multiplexed by the multiplexer 26, these contents being respectively given by the conditional access system 28 and by the scrambler 22 and then being transmitted on the network 8.

The system 28 also inserts into each ECM:
the identifier i of the channel,
the cryptograms $CW^*_{i,t}$ and $CW^*_{i,t+1}$ of the control words $CW_{i,t}$ and $CW_{i,t+1}$ enabling the cryptoperiods t and t+1 that immediately follow the channel i to be descrambled;
time stamps $TS_t$ and $TS_{t+1}$ that identify the instants at which the cryptoperiods t and t+1 must be played,
access conditions CA designed to be compared with access titles acquired by the user, and
a cryptographic redundancy or signature MAC used to verify the integrity of the ECM message The ECM message containing the pair of control words $CW_{i,t}/CW_{i,t+1}$ is denoted as $ECM_{i,t}$ here below in the description where:
the index i identifies the channel, and
the index t is an order number identifying the temporal position of this ECM relatively to the other different ECM messages sent out to descramble the channel i.
Here, the index t also identifies the cryptoperiod $CP_{i,t}$ which can be descrambled by means of the control word $CW_{i,t}$ contained in the message $ECM_{i,t}$. The index t is unique for each cryptoperiod $CP_{i,t}$.

The time stamps are defined relatively to an absolute origin independently of the multimedia content broadcast and of the channel on which the multimedia content is broadcast. The same identifier i is inserted in all the messages $ECM_{i,t}$ containing a cryptogram $CW^*_{i,t}$ for the descrambling of the multimedia contents broadcast on a same channel. By way of an illustration here, the scrambling and the multiplexing of the multimedia content is compliant with the DVB-Simulcrypt protocol (ETSI TS 103 197). In this case, the identifier i may correspond to a unique "channel ID/stream ID" pair on which are sent all the requests for the generation of ECM messages for this channel.

Each message $ECM_{i,t}$ has a pair $CW^*_{i,t}/CW^*_{i,t+1}$ of control word cryptograms. After decryption, this pair $CW^*_{i,t}/CW^*_{i,t+1}$ of cryptograms makes it possible to obtain a pair $CW_{i,t}/CW_{i,t+1}$ of control words. The cryptogram $CW^*_{i,t+1}$ contained in the message $ECM_{i,t}$ is herein used as a piece of chronological data to identify the message $ECM_{i,t+1}$ immediately consecutive to the message $ECM_{i,t}$. Indeed, for example after decryption of these cryptograms $CW^*_{i,t}$ and $CW^*_{i,t+1}$, the control word $CW_{i,t+1}$ can be compared with the first control words of the pair of control words contained in the message $ECM_{i,t+1}$. If there is a correspondence, it means that the message $ECM_{i,t+1}$ is effectively the message that immediately follows the message $ECM_{i,t}$. It is also possible to compare the control words $CW_{i,t}$ contained in the message $ECM_{i,t}$ with the second control word of the pair contained in the message $ECM_{i,t-1}$. If there is correspondence, it means that the message $ECM_{i,t-1}$ is effectively the message that immediately precedes the message $ECM_{i,t}$.

For example the terminals 10 to 12 are identical and only the terminal 10 is described in greater detail.

The terminal 10 is herein described in the particular case where it is capable of simultaneously descrambling two different channels i, j. To this end, the terminal 10 has two descrambling lines 60 and 62 used for the simultaneously descrambling respectively of the channels i, j. For example, the line 60 descrambles the channel i to display it on a display device 84 while, in parallel, the line 62 descrambles the channel j to record it by means of a recorder 64.

For example, these lines 60 and 62 are identical and only the line 60 shall now be described in detail.

The line 60 includes a receiver 70 of broadcast multimedia contents. This receiver 70 is connected to the input of a demultiplexer 72 which transmits on the one hand the multimedia content to a descrambler 74 and on the other hand the ECM message $ECM_{i,t}$ and the EMM (Entitlement Management Message) to a processor 76

The descrambler 74 descrambles the scrambled multimedia content using the control word transmitted by the processor 76. The descrambled multimedia content is transmitted to a decoder 80 which decodes it. The descrambled multimedia content is transmitted to a decoder 80 which decodes it. The decompressed or decoded multimedia content is transmitted to a graphic card 82 which drives the display of this multimedia content on the display unit 84 equipped with a screen 86.

The display unit 84 displays the multimedia content in plain form on the screen 86.

The processor 76 processes confidential information such as cryptographic keys. In order that the confidentiality of this information may be preserved, it is designed to be as robust as possible against attempted attacks by computer hackers. It is therefore more robust against these attacks than the other components of the terminal 10. For example, to this end the processor 76 is a chip card.

In this embodiment, the processor 76 is common to the lines 60 and 62.

For example, the processor 76 is made by means of programmable electronic computer or calculator 77 capable of executing instructions recorded on an information-recording medium. To this end, the processor 76 is connected to a memory 78 containing the instructions needed to execute the method of FIG. 3.

The memory 78 also contains:
a local table 79 for the analysis of channel changes, or zapping events,
an initial value Y for the counters $Kch_i$,
a number X whose value indicates the maximum number of channels being simultaneously monitored,
a limit P of channels that can be simultaneously descrambled by means of a same processor 76,
a time interval $\Delta T$, and
a threshold $\Delta E$ corresponding to a number of ECMs.

Typically, the values of X, P, $\Delta T$, $\Delta E$ and Y are either configured for once and for all in the factory when the processor 76 is being manufactured or can be configured after the processor 76 is put into service in the terminal 10 by means of a specific EMM transmitted from the device 6.

FIG. 2 is a schematic view of an example of a structure of the table 79. This table has five columns and X rows. The three small dots indicated in each of the columns is understood to mean that not all the pieces of data of this table 79 have been represented.

From the first to the fifth column, these columns respectively contain:
- the identifier of the monitored channel,
- the value of the counter $Kch_i$,
- the value of the counter $Kecm_i$,
- the value of the preceding control word received $LCW_i$ on the channel i by the processor 76, and
- the value of the time stamp $LTS_i$ contained in the preceding message $ECM_{i,p}$ received for the channel i.

Here below in the description, the values "p" and "c" of the index t correspond to the order numbers respectively of the preceding and of the new ECM received for the same channel i. The working of this system 2 shall now be described in greater detail with reference to the method of FIG. 3.

Initially, at a step 120, the device 6 broadcasts several different multimedia contents simultaneously on different channels. On each channel, the cryptoperiod t and the immediately consecutive cryptoperiod t+1 are scrambled with the control words, respectively $CW_{i,t}$ and $CW_{i,t+1}$. The messages $ECM_{i,t}$ and $ECM_{i,t+1}$ containing the cryptograms $CW^*_{i,t}$ and $CW^*_{i,t+1}$ of the control words $CW_{i,t}$ and $CW_{i,t+1}$ are multiplexed with the broadcast multimedia contents. This multiplexing enables the broadcasting of the control words to be synchronized with the broadcasting of the multimedia contents. Here, the cryptograms $CW^*_{i,t}$ and $CW^*_{i,t+1}$ are transmitted to the terminals during the cryptoperiod t−1 preceding the cryptoperiod t.

Typically, each message $ECM_{i,t}$ is repeated several times within a same cryptoperiod. For example, the messages $ECM_{i,t}$ are repeated every 0.1 seconds to 0.5 seconds. The duration of a cryptoperiod is greater than 5 seconds and preferably ranges from 5 seconds to 10 minutes. Here, the duration of a cryptoperiod is 10 seconds.

The scrambled multimedia contents are received substantially at the same time by each of the terminals 10 to 12. The following steps are therefore executed appreciably in parallel for each of these terminals. They are described in the particular case of the terminal 10.

Similarly, the operations performed in parallel by the lines 60 and 62 are similar. Here, they are described only in the particular case of the line 60.

During a step 122, the scrambled multimedia contents and the message $ECM_{i,t}$ are received by the receiver 70.

Then, at a step 124, the demultiplexer 72 extracts the scrambled multimedia content corresponding to the channel i, the descrambling of which is currently being requested by the user. At the step 124, the demultiplexer 72 also extracts only the messages $ECM_{i,t}$ associated with the channel i. The demultiplexer 72 transmits the extracted multimedia content to the descrambler 74. The extracted message $ECM_{i,t}$ is for its part transmitted to the processor 76. This message $ECM_{i,t}$ is the new ECM message received for the channel i and it is therefore hereinafter denoted as $ECM_{i,c}$.

At a step 126, the processor 76 compares the access conditions CA contained in the message $ECM_{i,c}$ with access titles pre-recorded in the memory 78.

If the user's access titles do not correspond to the access conditions CA then, at a step 128, the processor 76 inhibits the descrambling of the channel i by the terminal 10. For example, to this end, the processor 76 transmits no control word to the descrambler 74.

Should the access titles correspond to the access conditions CA then, at a step 132, the processor 76 deciphers the cryptograms $CW^*_{i,c}$ and $CW^*_{i,c+1}$ by means of an operating key recorded in the memory 78. Typically, this operating key is renewed once a month.

Then, at a step 134, the processor 76 decrements a counter Nb-ECM by a predetermined step. For example, the predetermined step is equal to 1.

At a step 136, the processor checks to see whether that the counter Nb-ECM has reached a predetermined threshold $S_0$. For example, here, the values of this threshold $S_0$ is equal to 0.

If the answer is affirmative, it goes to a step 138 for saving the table 79 in a non-volatile memory of the processor 76. In addition, at this step 138, the processor resets the counter Nb-ECM at an initial value $V_{save}$. For example, the value $V_{save}$ is equal to 200.

In the event of a current failure or a resetting of the processor 76, the table 79 is pre-loaded with the values of this table recorded in the non-volatile memory. Thus, a current failure or a resetting of the processor 76 does not make it possible to reset the different pieces of data contained in the table 79 at their initial values.

After the step 138 or directly after the step 136, if the value of the counter Nb-ECM has not reached the threshold $S_0$, the processor 76, at a step 140, increments all the counters $Kecm_i$ whose values are recorded in the table 79 by a predetermined step. For example, the predetermined step is equal to 1.

At a step 142, the processor checks to see if the channel for which the message $ECM_{i,c}$ is received, is a monitored channel. A monitored channel is a channel whose identifier i is contained in the first column of the table 79. To this end, the processor extracts the identifier i from the channel contained in the message $ECM_{i,c}$ received and then compares this identifier i with those contained in the first column of the table 79.

If none of the identifiers contained in the table 79 corresponds to the identifier i then, at a step 143, the processor 76 makes a search in this table for a row for which at least one of the following conditions is met:

$$TS_i - LTS_i > \Delta T, \text{or} \qquad 1)$$

$$Kecm_i > \Delta E. \qquad 2)$$

If one of the rows of the table 79 fulfills one of the conditions 1) or 2), it means that the processor 76 has not received any ECM messages for a long time for the channel corresponding to this row. The processor 76 is therefore no longer used to descramble the channel corresponding to this row. At a step 144, this row is then released in order to be used for monitoring the channel i. To this end, the cells of this row are completed as follows:
- the identifier i is recorded in the first column,
- the value of the counter $Kch_i$ is reset, i.e. taken as equal to Y,
- the value of the counter $Kecm_i$ is reset, i.e. taken as equal to 0,
- the control word $CW_{i,c+1}$ is recorded as the preceding control word $LCW_i$, received,
- the time stamp $TS_i$ is recorded as the preceding time stamp $LTS_i$ received.

At the end of the step 144, the method returns to the step 122 to process a new received ECM.

Should the channel i be already monitored, the processor 76 selects the corresponding row in the table 79 and proceeds to a step 150 during which it verifies that the message $ECM_{i,c}$ is received within a time slot FT immediately consecutive to the preceding message $ECM_{i,p}$ received for this channel i. The duration of the time slot FT is greater than or equal to the duration of a cryptoperiod. Here, the duration of the slot FT is equal to the maximum between the duration $D_{CP}$ of cryptoperiod, the duration of the interval $\Delta T$ and the duration $\Delta E^* D_{CP}/P$.

Here, the step 150 starts with an operation 152 during which the processor 76 checks that the message $ECM_{i,c}$ immediately follows the preceding message $ECM_{i,p}$. To this end, it compares the last control word $LCW_i$ received, the value of which is recorded in the fourth column of the table 79, with the control word $CW_{i,c}$ contained in the message $ECM_{i,c}$.

Should the control words $LCW_i$ and $CW_{i,c}$ be equal, the processor 76 proceeds directly to a step 153. At a step 153, the counter $Kch_i$ is decremented by a predetermined step equal for example to 1. At this step, in the table 79, the values of the control word $LCW_i$ and of the stamp $LTS_i$ are modified to be equal respectively to the control word $CW_{i,c+1}$ and $TS_c$. Finally, only the value of the counter $Kecm_i$ is reset at 0.

Should the control words $LCW_i$ and $CW_{i,c}$ be different, then in an operation 154, the difference between the time stamp $TS_c$ contained in the message $ECM_{i,c}$ and the time stamp $LTS_i$ contained in the table 79 is compared with the interval $\Delta T$. If this difference is smaller than the interval $\Delta T$, then the message $ECM_{i,c}$ is received within the slot FT and the processor 76 goes immediately to the step 153.

If not, it goes to an operation 156 during which it compares the value of the counter $Kecm_i$ associated with the channel i in the table 79 with the threshold $\Delta E$. Should the value of this counter $Kecm_i$ be smaller than the threshold $\Delta E$, the new message $ECM_{i,c}$ is received within the slot FT. The method therefore continues with the step 153. The number of messages $ECM_{j,c}$ processed by the processor 76 for other channels represents a duration that has elapsed since the reception of the message $ECM_{i,p}$.

If not, the message $ECM_{i,c}$ is considered to not have been received within the slot FT. This means that the processor 76 is not exclusively used to descramble the channel i. A step 158 is then performed. At the step 158, the counters $Kch_i$ and $Kecm_i$ are reset at their initial values. More specifically, the values of the counters $Kch_i$ and $Kecm_i$ are reset respectively at the value Y and zero. In addition, at the step 158, the control word $CW_{i,c+1}$ is recorded in the table 79 as the last control word received $LCW_i$. The value $LTS_i$ is taken to be equal to the stamp $TS_c$.*

The operations 154 and 156 thus prevent a stealthy or rapid channel change or zapping from causing the counter $Kch_i$ to be reset. A stealthy channel change is a brief to-and-fro movement towards another channel. This to-and-fro movement is short enough not to result in an interruption of the descrambling of the channel i which makes it difficult to view this channel. When the operations 154 and 156 are not performed, this stealthy changing systematically leads to a resetting of the counter $Kch_i$ which could be profitably used to thwart the method of detecting an illicit use of the processor 76 described here.

At the end of the step 153 or 158, the processor in a step 160 enumerates the number of counters $Kch_i$ equal to 0 and records the result in a variable Z.

At a step 162, the processor ascertains that the variable Z is strictly greater than 0.

If the answer is yes, it means that an illicit use of the processor 76 has been detected. In this case, the processor 76 carries out a step 164 during which it automatically triggers a countermeasure to combat this illicit use. Here, the countermeasure applied is chosen as a function of the value of the variable Z. Typically, the greater the value of the variable Z, the greater the strength of the applied countermeasure, i.e. the more difficult it is for the user.

Examples of countermeasures are given here below in rising order of strength:

1) Suspension of the descrambling of the channel or of all the channels during a predetermined duration followed by an automatic resumption of the descrambling of these channels once this predetermined time has elapsed.
2) Suspension of the descrambling of this channel and simultaneous display on the screen of a message asking the user to change channels before returning to the channel i to again authorize the descrambling of the channel i. In this case, the descrambling is again authorized only after the user has changed from the channel i to another channel.
3) Suspension of the processing of the ECM messages thus preventing the descrambling of the channels so long as the processor 6 has not been reset for example, by cutting power off to the terminal.
4) Preventing the descrambling of the channel or channels so long as a value recorded in the non-volatile memory of the processor 76 has not been reset by means of an EMM message. A countermeasure of this kind may oblige the user to contact the operator to prompt the sending of the EMM message enabling the processor 76 to be unlocked.
5) Definitive blocking of the processor 76 definitively preventing the use of this processor.

At the step 164, the value of the variable Z is preferably compared with the limit P indicating the number of channels that can be simultaneously descrambled by means of the processor 76. If the variable Z is strictly greater than the boundary P, it means definitely that this processor 76 is being used illicitly. In this case, a strong countermeasure such as the countermeasures 5) or 6) indicated here above is applied.

If the value of the variable Z is null or after the step 164, the method returns to the step 122 to process a new message ECM.

Here, the initial value Y of the counter $Kch_i$, the decrement step and the threshold to be attained to trigger the detection of an illicit use of the processor 76 are chosen so that this threshold is attained only after at least three hours and preferably after at least 12 hours or three days without any channel changing. For example, here the value Y is equal to 432000.

The interval $\Delta T$ is greater than twice the difference between the time stamps of two successive ECM messages. For example, the interval $\Delta T$ is at least equal to two minutes.

The threshold $\Delta E$ is at least greater than two and preferably greater than three or six.

Many other embodiments are possible. For example, the different counters described here can be incremented by a predetermined step instead of being decremented.

The increment or decrement step can be negative. Thus, in this description, decrementing a counter is considered to be exactly identical to incrementing a counter by a negative step.

The lines 60, 62 can be independent of one another as described with reference to FIG. 1 or they may share common resources. Typically, the sharing of common resources is done by time-multiplexing their use. The common resource can then be the receiver, the demultiplexer or the descrambler.

As a variant, the security processor or the terminal is equipped with a clock that measures the time interval elapsed between the instants of reception of the messages $ECM_{i,c}$ and $ECM_{i,p}$. Then, it is this interval that is used instead of the difference between the stamps $TS_{i,c}$ and $TS_{i,p}$. In this variant, $\Delta T$ is greater than twice the interval between the instants of reception of two immediately consecutive ECM messages.

One or two of the operations 152, 154 and 156 can be omitted. In particular, the different steps described here to prevent a resetting of the counter $Kch_i$ in the event of a stealthy channel change can be omitted.

The descrambling of several channels at the same time by using a same security processor can also be used in other contexts. For example, this is the case when it is possible to simultaneously display several channels on the same screen. This possibility is known for example by the term "picture in picture".

The countermeasures can be applied only to channels for which the counter $Kch_i$ has reached the threshold of detection of an illicit use. As a variant, each countermeasure is applied to all the channels.

Finally, other mechanisms to verify that the message $ECM_{i,c}$ has been received within a slot immediately consecutive to the message $ECM_{i,p}$ are possible. For example, as a variant, each message ECM additionally has a order number identifying its position relatively to the other ECM messages transmitted for the same channel. In this case, the reception of the message $ECM_{i,c}$ within the slot FT is for example verified by comparing the difference between the order numbers of the messages $ECM_{i,c}$ and $ECM_{i,p}$ with a predetermined threshold. In particular, the continuity between the message $ECM_{i,c}$ and the message $ECM_{i,p}$ is checked by verifying that their respective order numbers are effectively immediately consecutive. In this variant, it is then not necessary for each ECM message to comprise both control words $CW_{i,t}$ and $CW_{i,t+1}$ at the same time.

In this variant, the order number is then considered to be a time stamp since it constitutes a measurement, in number of cryptoperiods, of the number of cryptoperiods that have elapsed since a point of origin common to all the channels. Preferably, the duration of the time slot is strictly greater than the duration of a cryptoperiod.

The invention claimed is:

1. A method for detecting illicit use of an electronic security processor used for descrambling of different multimedia content disseminated on several respective channels, said method comprising at said electronic security processor, receiving entitlement control messages, $ECM_{i,t}$, to descramble a temporal sequence of cryptoperiods of a scrambled channel, i, each of said entitlement control messages $ECM_{i,t}$ comprising at least one cryptogram of a control word, $CW_{i,t}$, for enabling a cryptoperiod, $CP_{i,t}$, of said scrambled channel i to be descrambled, wherein i identifies said scrambled channel and index t is an order number, each time that said electronic security processor receives a new message, $ECM_{i,c}$, checking that said new message, $ECM_{i,c}$ is received within a predetermined time slot immediately consecutive to a preceding message $ECM_{i,p}$ received by said electronic security processor for said channel i, wherein indices c and p are two specific values of said order number t, incrementing a counter $Kch_i$ by a predetermined step whenever, after verification, said message $ECM_{i,c}$ is received within a time slot immediately consecutive to said preceding message $ECM_{i,p}$ and, if not, resetting said counter $Kch_i$ to an initial value thereof, detecting an illicit use when said counter $Kch_i$ reaches a predetermined threshold; enumerating the new messages $ECM_{j,c}$ received b said electronic security processor for channels other than said scrambled channel i since the last message $ECM_{i,p}$ received; and verifying that said new message $ECM_{i,c}$ is received within the time slot in checking whether the number of new messages $ECM_{i,c}$ received for channels other than said scrambled channel i is greater than or equal to a predetermined threshold greater than two.

2. The method of claim 1, wherein each received message $ECM_{i,t}$ further comprises a piece of chronological data for enabling identification of either one of an immediately preceding message $ECM_{i,t-1}$ and an immediately following message $ECM_{i,t+1}$, and wherein said method further comprises verifying that said received new message $ECM_{i,c}$ is received within said time slot, and verifying, on the basis of said piece of chronological data contained in one of said new message $ECM_{i,c}$ and said preceding message $ECM_{i,p}$, that said received new message $ECM_{i,c}$ is a message immediately consecutive to said preceding $ECM_{i,p}$.

3. The method of claim 1, further comprising verifying that said received new message $ECM_{i,c}$ is received within said time slot, and verifying that a difference between time stamps $TS_c$ and $TS_p$ included, respectively, in said new message $ECM_{i,c}$ and said preceding message $ECM_{i,p}$, is smaller than a predetermined time interval $\Delta T$ greater than twice the time interval between time stamps of said immediately consecutive messages $ECM_{i,t}$ and $ECM_{i,t+1}$.

4. The method of claim 1, further comprising measuring a time interval $\Delta V_{c,p}$ between instants of reception of said new message $ECM_{i,c}$ and said preceding message $ECM_{i,p}$, and verifying that said new message $ECM_{i,c}$ is received within said time slot in checking whether that said measured interval $\Delta V_{c,p}$ is less than or equal to a predetermined interval slot $\Delta T$ greater than twice a time interval $\Delta V_{t,t+1}$ that can be measured between instants of reception of said immediately consecutive messages $ECM_{i,t}$ and $ECM_{i,t+1}$.

5. The method of claim 1, further comprising selecting said counter $Kch_i$ to be incremented from among two or more possible counters $Kch_j$ as a function of an identifier of said channel i contained in the message $ECM_{i,c}$.

6. The method of claim 5, further comprising enumerating channels associated with a counter $Kch_i$ that has reached or exceeded a respective predetermined threshold thereof, comparing a number Z of counters $Kch_i$ that have reached or exceeded their respective predetermined threshold with a predetermined limit P equal to a maximum number of channels that can be simultaneously descrambled by said electronic security processor, and if said number of counters Z is greater than or equal to said predetermined limit P, automatically triggering a strong countermeasure and, if not, triggering a weaker countermeasure.

7. The method of claim 1, wherein said method comprises, in response to detecting an illicit use, automatically triggering a countermeasure that prevents descrambling of said scrambled channel i and displays a message on a screen asking said user to perform a specific action to restore descrambling of said channel i.

8. The method of claim 7, wherein asking said user to perform a specific action comprises asking said user to perform a channel change.

9. A tangible and non-transitory computer readable medium having encoded thereon instructions for executing, on an electronic computer, a method for detecting illicit use of an electronic security processor used for descrambling of different multimedia content disseminated on several respective channels, said instructions comprising instructions for, at said electronic security processor, receiving entitlement control messages, $ECM_{i,t}$, to descramble a temporal sequence of cryptoperiods of a scrambled channel, i, each of said entitlement control messages $ECM_{i,t}$ comprising at least one cryptogram of a control word, $CW_{i,t}$, for enabling a cryptoperiod, $CP_{i,t}$, of said scrambled channel i to be descrambled, wherein i identifies said scrambled channel and index t is an order number, each time that said electronic security processor receives a new message, $ECM_{i,c}$, checking that said new message, $ECM_{i,c}$ is received within a predetermined time slot immediately consecutive to a preceding message $ECM_{i,p}$ received by said electronic security processor for said channel i, wherein indices c and p are two specific values of said order number t, incrementing a counter $Kch_i$ by a predetermined step whenever, after verification, said message $ECM_{i,c}$ is received within a time slot immediately consecutive to said preceding message $ECM_{i,p}$ and, if not, resetting said counter $Kch_i$ to an initial value thereof, and detecting an illicit use when said counter $Kch_i$ reaches a predetermined threshold; enumerating the new messages $ECM_{j,c}$ received by said electronic security processor for channels other than said scrambled channel i since the last message $ECM_{i,p}$ received; and verifying that said new message $ECM_{i,c}$ is received within the time slot in checking whether the number of new messages $ECM_{j,c}$ received for channels other than said scrambled channel i is greater than or equal to a predetermined threshold greater than two.

10. An apparatus comprising an electronic security processor for a terminal used to descramble multimedia content disseminated on several respective channels, said electronic security processor being configured for receiving entitlement control messages, $ECM_{i,t}$, to descramble a temporal sequence of cryptoperiods of a scrambled channel i, each new message $ECM_{i,t}$ comprising at least one cryptogram of a control word $CW_{i,t}$ for enabling a cryptoperiod $CP_{i,t}$ of said scrambled channel i to be descrambled, said index i identifying said scrambled channel and said index t being an order number, whenever a new message $ECM_{i,c}$ is received, checking that said new message $ECM_{i,c}$ is received within a predetermined time slot immediately consecutive to a preceding message $ECM_{i,p}$ received by said electronic security processor for said channel i, wherein indices c and p are two specific values of said order number t, incrementing a counter $Kch_i$ by a predetermined step whenever, after verification, said new message $ECM_{i,c}$ is received within a time slot immediately consecutive to said message $ECM_{i,p}$ and, if not, resetting said counter $Kch_i$ to an initial value thereof, and detecting an illicit use when said counter $Kch_i$ reaches a predetermined threshold; enumerating the new messages $ECM_{j,c}$ received by said electronic security processor for channels other than said scrambled channel i since the last message $ECM_{i,p}$ received; and verifying that said new message $ECM_{i,c}$ is received within the time slot in checking whether the number of new messages $ECM_{j,c}$ received for channels other than said scrambled channel i is greater than or equal to a predetermined threshold greater than two.

\* \* \* \* \*